E. B. WATSON.
VENTILATING COVER FOR CANS.
APPLICATION FILED AUG. 16, 1916.
1,232,134.
Patented July 3, 1917.
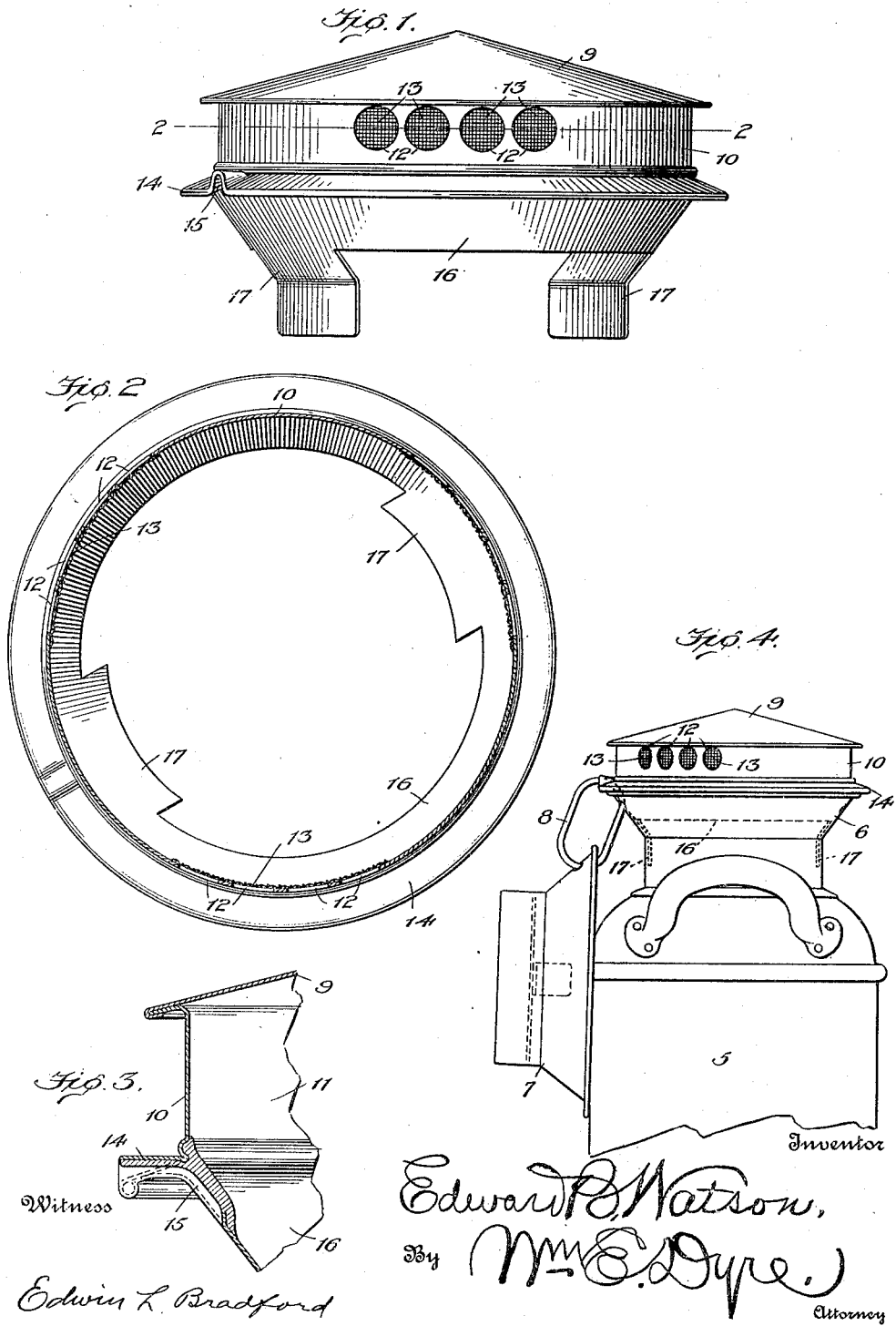

UNITED STATES PATENT OFFICE.

EDWARD B. WATSON, OF TOLEDO, OHIO.

VENTILATING-COVER FOR CANS.

1,232,134.

Specification of Letters Patent.

Patented July 3, 1917.

Application filed August 16, 1916. Serial No. 115,197.

*To all whom it may concern:*

Be it known that I, EDWARD B. WATSON, a citizen of the United States, residing at Toledo, in the county of Lucas and State of Ohio, have invented certain new and useful Improvements in Ventilating-Covers for Cans; and I do hereby declare the following to be a full, clear, and exact description of the invention, such as will enable others skilled in the art to which it appertains to make and use the same.

My invention relates to dairy apparatus and to cans for containing milk and cream, but more particularly to an improved ventilated top or cover for cream cans.

Ordinarily the dairy farmer accumulates cream skimmings in one can or receptacle, transferring this to another can for purposes of cooling, and finally to a shipping can in which latter it may be sealed previous to shipment. As distinguished from this method my invention contemplates gathering, cooling, and finally shipping cream in one and the same receptacle, if desired.

A further object of the present invention is the production of removable cooling and ventilating covers adapted to fit cans which are provided with shipping covers either attached or unattached to the neck thereof.

A further object is the production of detachable ventilating covers adapted and adaptable to fit cans having necks varying somewhat in diameter.

A further object is the production of detachable covers, of the character described, for use upon cans, constructed and arranged so as to effectually protect their contents from objectionable foreign matter, and at the same time to be secured in operative position without liability of accidental displacement.

With the foregoing and other objects and advantages in view, the invention will be hereinafter particularly described and pointed out in the claims following.

In the accompanying drawings which form part of this application for Letters Patent, and whereon corresponding reference numerals indicate like parts in the several views:

Figure 1 is a side elevation of my improved ventilating cover for cream and milk cans, detached.

Fig. 2 is a horizontal sectional view of the invention taken on the line 2—2 of Fig. 1.

Fig. 3 is a detail fragmentary view, being a vertical section through one side of the invention, and Fig. 4 is a side elevation, upon a relatively reduced scale, of the upper portion of an ordinary cream or milk can, its usual cover being attached thereto by a link connection, and showing also my improved detachable ventilating cover in operative position.

Reference being had to the drawings and numerals thereon, 5 indicates an ordinary milk or cream can, having an outwardly flaring or diverging neck 6, and a removable closure 7 secured to the neck thereof by a link 8, as is customary with many of this class of devices. The hollow removable ventilating cap or cover shown by Fig. 1 of the drawings, however, constitutes the present invention, and comprises a top 9, preferably of conical form the better to shed rain water, and slightly overhanging at its peripheral edges, a vertical annular wall 10, and an air chamber 11 formed by and within the said annular wall.

At intervals the said wall 10 is perforated for ventilating purposes as at 12, the said perforations being crossed and guarded by wire gauze or netting 13, as shown by Figs. 1, 2 and 4, to prevent entrance of foreign matter. Immediately below said annular wall 10 there is provided a second or lowermost outwardly extending annular flange 14 which encircles the structure and is also slightly downturned the better to serve as a water-shed and closure-flange when engaging the upper edge of a can.

At one point in its periphery the lowermost flange 14 is indented or grooved as at 15 so as to accommodate the upstanding portion of link 8, common to such cans generally, thus allowing the flange 14 of the ventilating cover to close smoothly upon the upper edge of a can or can neck 6, as shown by Fig. 4.

From the edge of flange 14, body 16 of the present invention converges rapidly, as best shown by Fig. 1, so as to fit snugly and form a closure for cans which may be reduced somewhat in diameter as compared with that illustrated, and at points diametrically opposite, as shown by Figs. 1 and 2, the said body portion 16 of the invention extends downwardly terminating in spring ears 17, 17, capable of being flexed in either direction to further adapt the ventilator to cans of varying diameter, and to assist by frictional contact in retaining same in operative position.

This being substantially the construction of my invention in the best form at present known to me, it will be obvious that, by agency of my improved ventilator the process of cooling cream preparatory to its shipment is greatly facilitated. This cooling may be accomplished in an ordinary can 5 from which the cover 7 has been removed, as indicated by Fig. 4. Much trouble was experienced by shippers in the loss of detachable covers 5, and for this reason it has become customary to secure such covers to the necks of their respective cans by means of a link such as 8. This link, however, constitutes an obstruction and interference with snugly replacing another cover of any description when parts occupy the relation indicated by Fig. 4, unless provision is made for bridging the said link obstruction, and this among other things, the present invention contemplates and provides for.

It is not the intention to ship my improved ventilating cover, nor to confine its use to any one can, but on the contrary it may be introduced into the neck 6 of any can which the farmer may select as a receptacle for cream, and when so introduced, obviously the frictional engagement of ears 17 with the inner surface of neck 6 serves to retain the ventilator as a whole securely and yet removably in position.

From time to time the said ventilating cover may be removed, cream introduced and the cover quickly replaced, the peripheral groove 15 providing ample clearance for that portion of link 8, which would otherwise offset the said ventilator and render impossible a close fitting bug-proof and dirt-proof joint.

When applied to a can 5 in operative position, as shown by Fig. 4, it is quite obvious that fresh air will circulate freely through the numerous screens 13, and will naturally descend into cooling contact with the surface of the body of cream, the natural heat of which produces upward currents giving place to down-currents of cooling air and thus producing a constant circulation until the cooling process is complete, and the can filled to the limit of its capacity with cream.

This accomplished, my improved ventilator is removed, or transferred to another cream can, the ordinary closed cover 7 being replaced, and sealed in closed relation, whereupon the can with its contents is ready for shipment without the necessity of transferring the cream to another can.

This being a description of my invention, what I now claim and desire to secure by Letters Patent is:

1. A removable ventilating cover for milk cans comprising a closed top having a depending ventilated wall, a laterally extending closure flange projecting outwardly from the base of said wall and an inwardly inclined flange depending from said closure flange adjacent its juncture with said ventilated wall, said closure flange and depending flange being recessed to provide for the reception of a cover link to permit the accurate fitting of said cover to the can.

2. A removable ventilating cover for milk cans comprising a closed top having a depending ventilated wall, a laterally extending closure flange projecting outwardly from the base of said wall and an inwardly inclined flange depending from said closure flange adjacent its juncture with said ventilated wall and carried downwardly to provide flexible ears for engaging the inner neck of the can.

In testimony whereof I affix my signature, in presence of two subscribing witnesses.

EDWARD B. WATSON.

Witnesses:
 FOSTER E. SPENCE,
 CLARA C. LINENKUGEL.

Copies of this patent may be obtained for five cents each, by addressing the "Commissioner of Patents, Washington, D. C."